United States Patent
Gilligan et al.

(10) Patent No.: US 12,545,882 B2
(45) Date of Patent: Feb. 10, 2026

(54) APPARATUS FOR TREATING BIOLOGICAL CELL CULTURES

(71) Applicant: AIXINNO Ltd., Cambridge (GB)

(72) Inventors: Patrick Clemente Gilligan, Cambridge (GB); David Anthony Bullinaria, Huntingdon (GB); Kenneth Boh Khin Teo, Cambridge (GB)

(73) Assignee: AIXINNO Ltd., Cambridge (GB)

( * ) Notice: Subject to any disclaimer, the term of this patent is extended or adjusted under 35 U.S.C. 154(b) by 783 days.

(21) Appl. No.: 17/781,149

(22) PCT Filed: Dec. 11, 2020

(86) PCT No.: PCT/EP2020/085686
§ 371 (c)(1),
(2) Date: May 31, 2022

(87) PCT Pub. No.: WO2021/116369
PCT Pub. Date: Jun. 17, 2021

(65) Prior Publication Data
US 2022/0411740 A1    Dec. 29, 2022

(30) Foreign Application Priority Data
Dec. 11, 2019    (DE) .................... 10 2019 134 002.0

(51) Int. Cl.
*C12M 1/34*    (2006.01)
*B01L 1/02*    (2006.01)
(Continued)

(52) U.S. Cl.
CPC .............. *C12M 41/34* (2013.01); *B01L 1/02* (2013.01); *C12M 23/34* (2013.01); *C12M 29/06* (2013.01);
(Continued)

(58) Field of Classification Search
CPC ...... C12M 41/34; C12M 41/14; C12M 23/34; C12M 23/12; C12M 23/50; C12M 29/06;
(Continued)

(56) References Cited

U.S. PATENT DOCUMENTS 4,786,601 A    11/1988  Rothenberg
4,968,625 A    11/1990  Smith et al.
(Continued)

FOREIGN PATENT DOCUMENTS

CN    105531548 A    4/2016
DE    3 879 631 T2    7/1993
(Continued)

OTHER PUBLICATIONS

International Search Report mailed Apr. 13, 2021, from ISA/European Patent Office, for International Patent Application No. PCT/EP2020/085686 (filed Dec. 11, 2020), 9 pgs.
(Continued)

*Primary Examiner* — Michael L Hobbs
(74) *Attorney, Agent, or Firm* — Ascenda Law Group, PC

(57) ABSTRACT

A treatment apparatus for treating biological cell cultures, located in respective storage chambers of a carrier, includes a work deck with one or more bearing spots for bearing the carrier. Each of the bearing spots includes a bearing region corresponding to an area of the carrier. The treatment apparatus additionally includes nozzles for producing a gas flow in a space above the work deck. To avoid liquid droplets or cell material being transported from one storage chamber to another as a result of a horizontal gas flow above the carrier during the treatment, the nozzles are arranged outside of and along an edge of the bearing region or within the bearing region and form a gas curtain around the carrier or the respective storage chambers.

16 Claims, 4 Drawing Sheets

(51) Int. Cl.
*C12M 1/00* (2006.01)
*C12M 1/12* (2006.01)

(52) U.S. Cl.
CPC ........ *C12M 37/02* (2013.01); *B01L 2200/141* (2013.01)

(58) Field of Classification Search
CPC ......... C12M 29/00; C12M 37/02; B01L 1/02; B01L 2300/0829; B01L 2200/141
See application file for complete search history.

(56) References Cited

U.S. PATENT DOCUMENTS

| | | | |
|---|---|---|---|
| 5,169,217 A * | 12/1992 | Orchard | C12M 41/14 312/223.1 |
| 5,525,512 A | 6/1996 | Pieler et al. | |
| 6,143,250 A | 11/2000 | Tajima | |
| 6,146,592 A | 11/2000 | Kawashima et al. | |
| 6,360,792 B1 | 3/2002 | Ganz et al. | |
| 2003/0031602 A1 | 2/2003 | Weselak et al. | |
| 2004/0152188 A1 | 8/2004 | Yamamoto et al. | |
| 2004/0200227 A1 | 10/2004 | Melching et al. | |
| 2005/0084420 A1 | 4/2005 | Osawa et al. | |
| 2007/0005920 A1 | 1/2007 | Bacon et al. | |
| 2012/0178120 A1 | 7/2012 | Samson | |
| 2014/0273242 A1 | 9/2014 | Ochranek et al. | |
| 2015/0050725 A1 | 2/2015 | Pieczarek et al. | |
| 2015/0323237 A1 | 11/2015 | Kim et al. | |
| 2016/0298867 A1 | 10/2016 | Hata et al. | |
| 2018/0202908 A1 | 7/2018 | Croquette et al. | |

FOREIGN PATENT DOCUMENTS

| | | |
|---|---|---|
| DE | 10 203 863 A1 | 8/2003 |
| DE | 10 2004 049 210 A1 | 6/2005 |
| DE | 10 303 736 B4 | 5/2007 |
| EP | 2 068 155 A2 | 6/2009 |
| EP | 2 848 679 A1 | 3/2015 |
| EP | 3 103 860 A1 | 12/2016 |
| EP | 3 229 028 A1 | 10/2017 |
| WO | 93/03891 A1 | 3/1993 |
| WO | 03/008103 A1 | 1/2003 |
| WO | 2007/043561 A1 | 4/2007 |
| WO | 2011/047710 A1 | 4/2011 |

OTHER PUBLICATIONS

Written Opinion mailed Apr. 13, 2021, from ISA/European Patent Office, for International Patent Application No. PCT/EP2020/085686 (filed Dec. 11, 2020), 9 pgs.
First Search issued May 28, 2025, from The State, Intellectual Property Office of People's Republic of China, for Application No. 2020800864411 (filed Dec. 11, 2020), 4 pgs.
First Office Action issued May 28, 2025, from The State, Intellectual Property Office of People's Republic of China, for Application No. 2020800864411 (filed Dec. 11, 2020), 10 pgs.

* cited by examiner

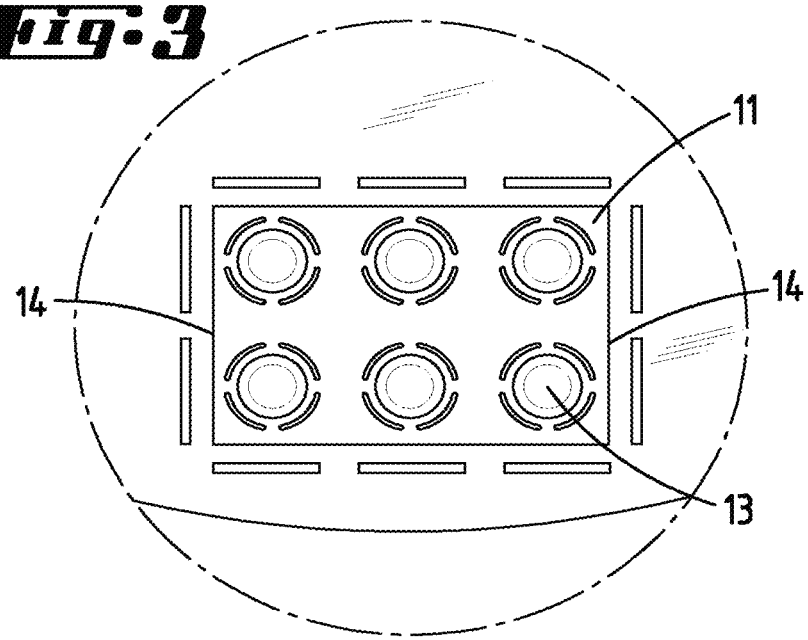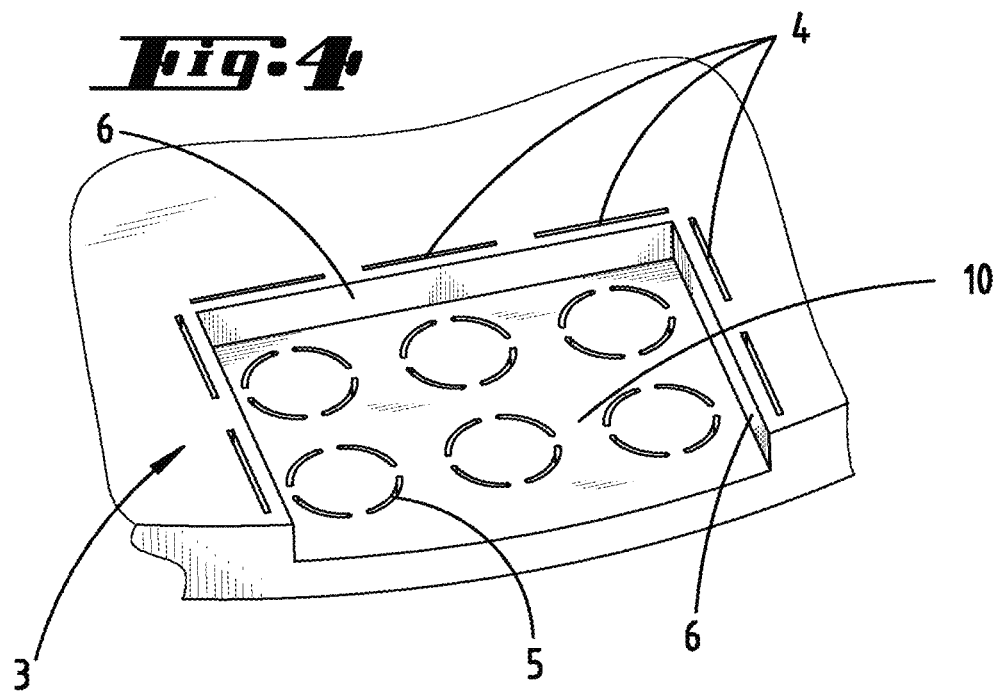

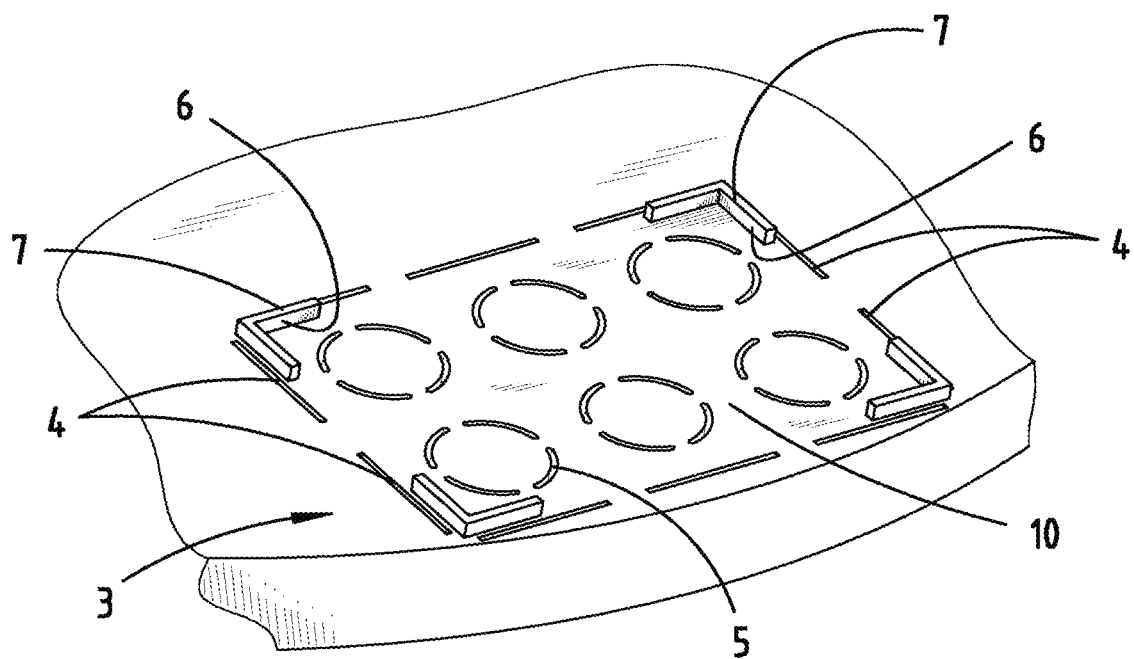

APPARATUS FOR TREATING BIOLOGICAL CELL CULTURES

RELATED APPLICATIONS

This application is a National Stage under 35 USC 371 of and claims priority to International Application No. PCT/EP2020/085686, filed 11 Dec. 2020, which claims the priority benefit of DE Application No. 10 2019 134 002.0, filed 11 Dec. 2019.

FIELD OF THE INVENTION

The invention initially relates to an apparatus for treating biological cell cultures, which are located in storage chambers of a carrier, with a work deck that has one or several bearing spots for bearing a respective carrier, wherein a bearing region of the bearing spot corresponds to an area of the carrier, and with nozzles for generating a gas flow in a space above the work deck.

BACKGROUND

Treatment apparatuses for treating biological cells are known in prior art, in particular from US 2018/0202908 A1, U.S. Pat. No. 6,146,592, EP 33 229 028 A1, US 2014/0273242 A1, WO 03/008103 A1, WO 93/03891 A1, EP 2 068 155 A2, WO 2011/047710 A1, US 2007/005920 A1 and U.S. Pat. No. 6,360,792 B1. A treatment apparatus of the generic kind has a housing, which is essentially gastight to the outside. Located inside of the housing is a work plate, for example a work deck, which has a plurality of bearing spots, on which a respective carrier can be placed. The carriers are preferably standardized microplates of the kind described in US 2012/0178120 A1 or U.S. Pat. No. 6,143,250. A pipette arrangement or the like can be used to remove a cell culture from a storage chamber of the carrier. The pipette arrangement can also be used to supply a nutrient to a storage chamber. The nutrient can be stored in a nutrient container. The latter can have a layout that corresponds to the layout of the carrier. A pure gas flow is generated in the housing of the treatment apparatus by means of a fan and a filter, and flows parallel to the work plate as a laminar flow. Liquid is transported while treating the cell cultures, which are stored in the storage chambers. Droplets, in particular microdroplets, can form, and be transported along by the gas flow. This can result in cells of a cell culture arranged in a storage chamber being transported into an adjacent storage chamber, in which cells of another cell culture are stored. Such an accidental infection of foreign cell cultures is undesired.

DE 10 303 736 B4 describes a climate cabinet with a loading opening, through which a slide can be transported. The loading opening has two side walls turned toward each other, which are provided with openings through which a gas flow into the loading opening can be generated.

DE 3879 631 T2 describes a carrier for cell cultures with a space flushable with a gas, which has gas outlet openings arranged between adjacent storage chambers of the carrier.

U.S. Pat. No. 5,525,512 shows a cabinet for accommodating carriers with storage chambers for accommodating cell cultures, wherein openings for accommodating a respective carrier are provided in addition to bearing spots.

U.S. Pat. No. 4,968,625 describes a carrier with storage chambers for accommodating cell cultures, wherein perforations for separating adjacent storage chambers are arranged between the storage chambers.

WO 2007/043561 A1 describes a table for accommodating a carrier with cell cultures, wherein the table has an opening through which an optical path passes, so that the cell cultures can be observed with a microscope.

SUMMARY OF THE INVENTION

The object of the invention is to indicate measures with which accidental infections of foreign cell cultures can at least be diminished, preferably prevented. In particular, the invention relates to the further development of a work deck and a carrier, wherein the carrier preferably is a platelike carrier in the form of a microplate, and has a plurality of storage chambers.

The object is achieved by the invention indicated in the claims, wherein the dependent claims are not only advantageous further developments of the invention indicated in the independent claims, but also independent solutions to the problem.

First and foremost, the invention relates to a treatment apparatus for treating biological cell cultures, which are located in storage chambers of one several carriers. A work deck is provided, which has one or several bearing spots for bearing a respective carrier. The bearing region of the bearing spot has an area corresponding to the area of a carrier. In particular, means are provided with which the carrier can be adjusted on the bearing region. The carrier then assumes a predefined position on the work deck. According to the invention, nozzles are arranged outside of and along the edge of the bearing region. These nozzles can be used to generate a gas flow having a direction transverse to the area extension of the bearing region or transverse to the area extension of the upper side of the work deck. The gas flow generated by the nozzles preferably runs transverse to the laminar gas flow that flows parallel to the work plate inside of the housing. The gas flow generated by the nozzles is used to generate a gas curtain, which can surround the carrier, and which forms a barrier that prevents droplets from being transported away from a carrier, in particular to another carrier. In one alternative of the invention, the nozzles are arranged inside of the bearing region. A carrier used in this alternative has one or several storage chambers for accommodating biological cell cultures, each having a layout or an opening region. One or several gas passage openings are arranged outside of and along the edge of the layout or the opening region of the storage chamber. The gas passage openings can be annularly arranged around the layout or the opening region of the storage chamber. The gas passage openings form openings in a lower side of the carrier, which align with nozzles arranged in particular inside of the bearing region of the work deck, so that a gas flow generated by the nozzles can flow through the gas passage opening. This alternative generates a gas curtain that surrounds a storage chamber, so that a barrier is created that prevents the transport of droplets from a storage chamber in particular toward an adjacent storage chamber. Further developments are mentioned below, which further develop the apparatus according to the invention or the carrier according to the invention, both separately and in combination with each other. The bearing region is a rectangular region. However, it can also be a polygonal region or a round region. The nozzles extend along lines that run at a constant distance to the edges of the bearing region. The lines can be straight lines that extend parallel to the edges of the bearing region. However, the lines can also be curved. The work deck can have a circular shape. Several bearing regions are arranged around a center of the work deck. The bearing regions can have an identical radial distance to the center. The work deck can be rotatable around the center. Means can be provided for generating a gas flow inside of a housing that is essentially or nearly gastight to the outside and incorporates the work deck, which is conducted through the housing and over the work deck. The means can have a filter and a fan. The preferably laminar gas flow generated by the fan has a direction perpendicular to the gas flows generated by the nozzles. The gas passage openings inside of the carrier comprise connecting channels between the lower side of the carrier, which preferably lies flat on the bearing region, and the upper side of the carrier, in which the opening regions of the storage chambers are located. Several nozzles can be connected with each other by gas lines. The gas lines can be located in the work deck. A pump is connected to the gas lines to generate a negative pressure. The nozzles then operate as suction nozzles, and generate a gas flow directed into the work deck. However, it is also possible that a gas flow generated by a second fan exits from the nozzles and enters into the housing. The carrier is preferably comprised of a carrier plate, and especially preferably of a microplate with a layout of 127.76 mm×85.48 mm, and positioning flanks can be provided to adjust it to the bearing spot. The carrier can have positioning flanks that abut against positioning flanks of the bearing spot. The positioning flanks can be formed by the side walls of a depression or side walls of ribs or bars. The nozzles are preferably arranged directly adjacent to the positioning flanks. The positioning flanks of the bearing spot can form a frame or sections of a frame. The nozzles then preferably border the frame directly. The nozzles are preferably arranged in such a way as to generate a gas curtain that completely surrounds the carrier or storage chamber and/or is uniform. The nozzles can consist of oblong slits, which extend in an upper side of the work deck. The openings of the gas passage openings that empty into the upper side of the carrier likewise preferably have an oblong shape. The nozzles or opening regions of the gas passage openings are so closely adjacent to each other that a closed gas curtain forms. The storage chamber can preferably have a circular shape. The gas passage openings can extend on a circular arc line around the opening region of the supply chamber. A variant of the invention provides that the supply chamber have a tubelike wall. This wall has an interior side and an exterior side. The interior side is the inner wall of the supply chamber. The exterior side directly adjoins the gas passage openings, so that a gas flow brushing along the exterior side of the wall forms. In a further development of the invention, it is proposed that the carriers that have storage chambers be first carriers, and that second carriers preferably having the same area as the first carriers carry liquids or other treatment means. In particular, the second carriers have supply volumes for a nutrient liquid or brackets for holding pipette tips. In what is regarded as an advantage of the invention, openings basically known in prior art can be used to generate directed gas flows. It is here especially advantageous that these directed gas flows extend transverse to a laminar gas flow. It is further advantageous that the actively generated gas flows form gas curtains.

BRIEF DESCRIPTION OF THE DRAWINGS

Exemplary embodiments of the invention will be described below based upon attached drawings. Shown on:

FIG. 3 is a magnified view of the cutout III on FIG. 2, FIG. 4 is a perspective view of a bearing spot 10 on a work deck 3, FIG. 5 likewise is a perspective view of a differently designed bearing spot 10 on a work deck 3.

DETAILED DESCRIPTION

Figure 1:
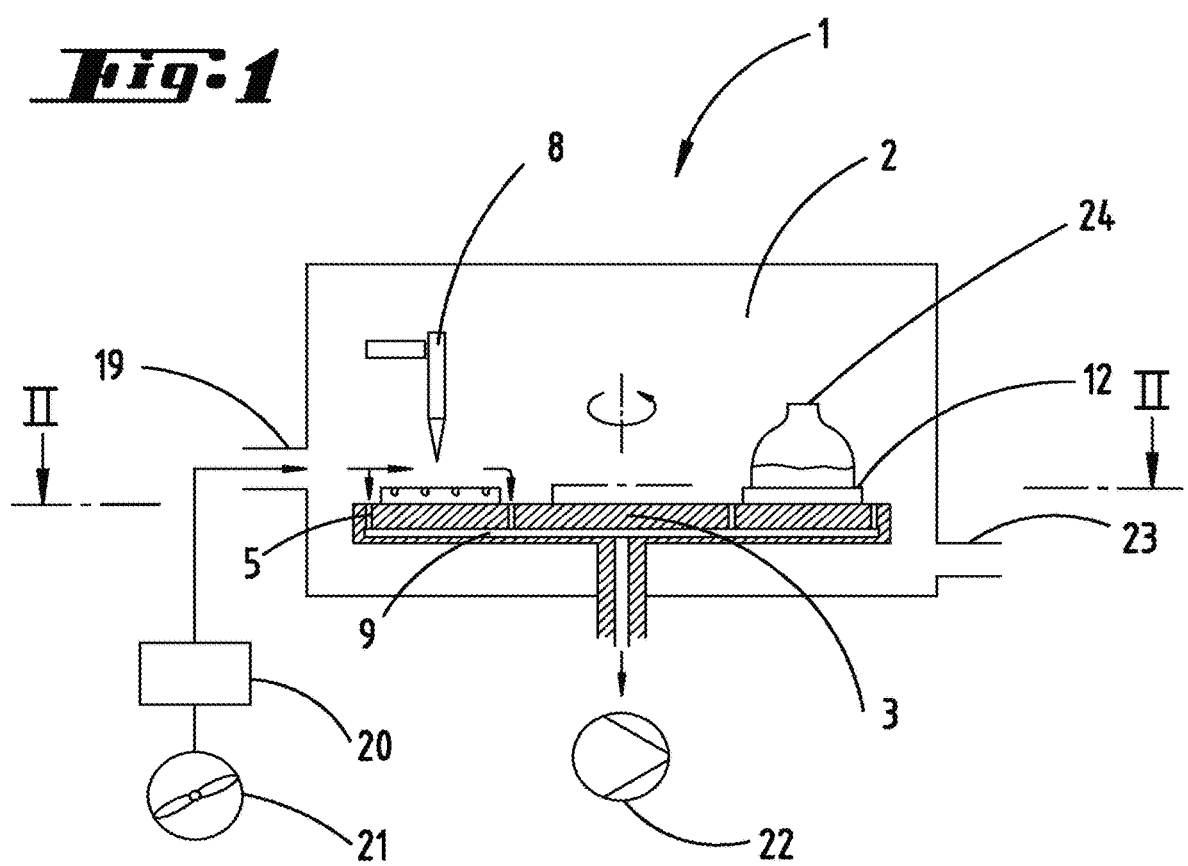
FIG. 1 is a schematic, sectional view of an apparatus according to the invention.
Figure 2:
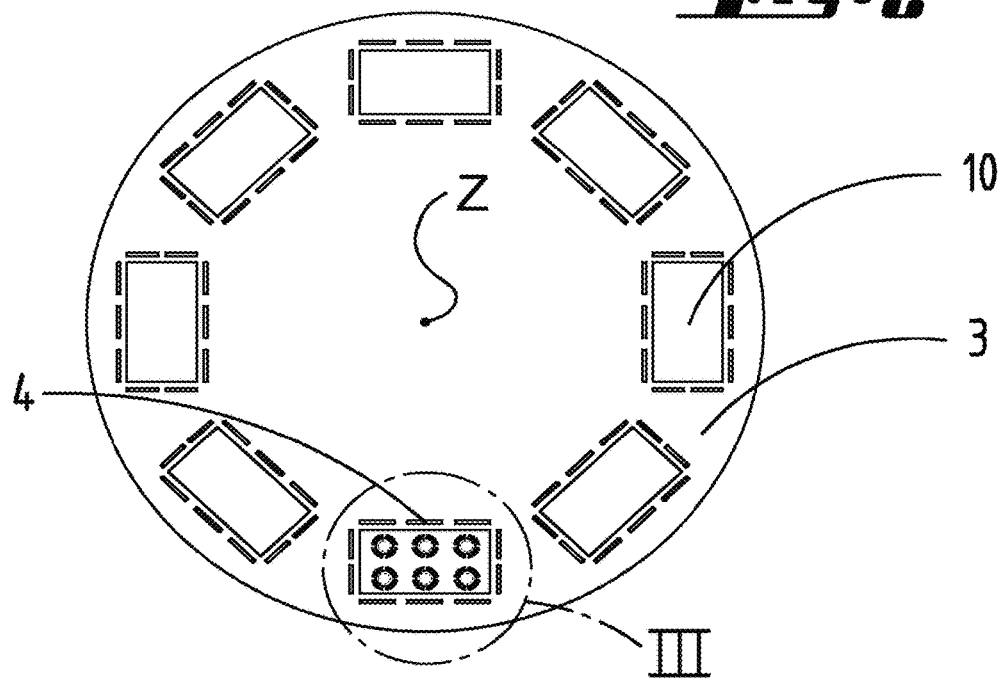
FIG. 2 is a top view along line II-II of a work deck 3 with several bearing spots 10.
Figure 6:
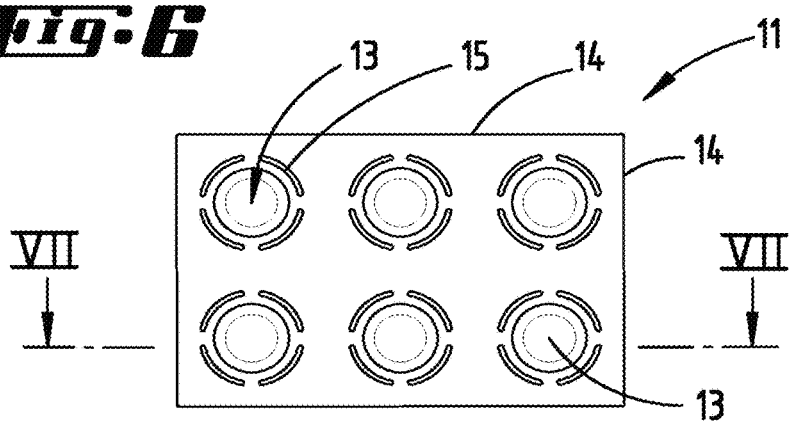
FIG. 6 is a top view of a carrier 11 with several storage containers 13.
Figure 7:
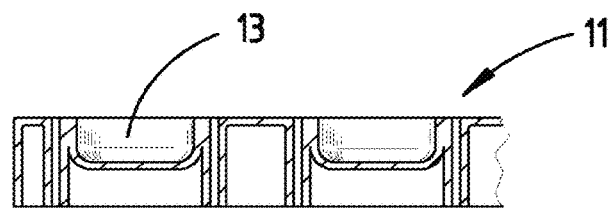
FIG. 7 is a section along line VII-VII on FIG. 6.
Figure 8:
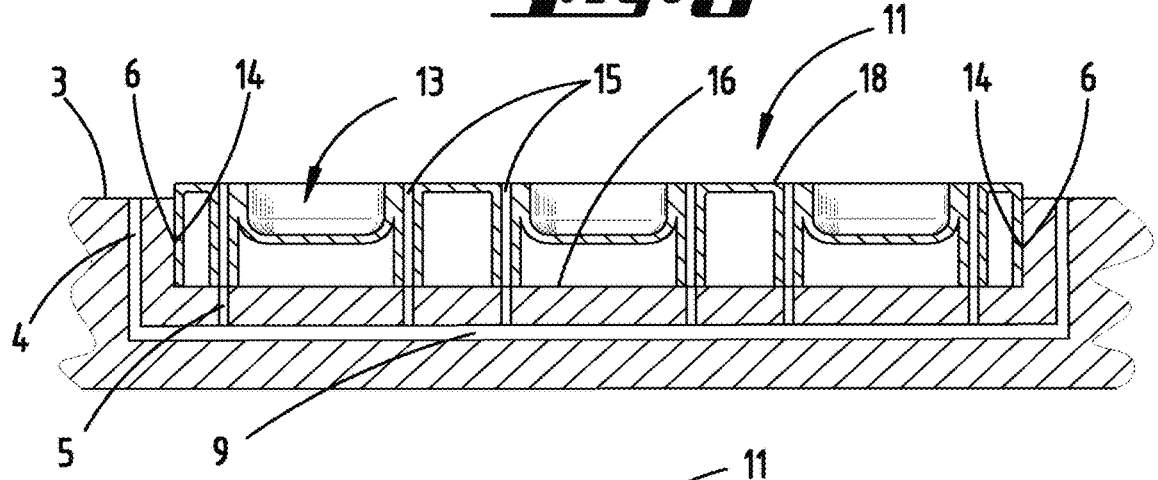
FIG. 8 is a sectional view of a carrier according to FIGS. 6 and 7, placed in a pocket of a bearing spot 10 of a work deck 3 formed by positioning flanks 14.

FIG. 1 shows a housing 1, which shields a treatment space 2 arranged inside of the housing 1 away from the ambient atmosphere. A fan 21 can be used to generate a gas flow, which is filtered with a filter 20. The gas flow generated by the fan 21 passes through an inlet opening 19 and enters into a treatment space 2, through which it flows in roughly a horizontal direction, so as to exit from it once again through an outlet opening 23.

Located inside of the treatment space 2 is a work deck 3, which has a circular upper side. The work deck 3 has a center Z, and can be rotated around the center Z into various working positions. Several treatment means can be arranged inside of the treatment space 2. A pipette arrangement 8 is shown as an example. This pipette arrangement 8 can be used to remove liquid from a bottle 24 arranged on a carrier 12 with a pipette. The liquid can be brought into a supply chamber 13 of another carrier 11. A cell culture is located in the supply chamber 13.

A plurality of bearing spots 10 is arranged on the upwardly facing broadside region of the work deck 3. FIGS. 4 and 5 exemplarily show different variants of bearing spots 10. Positioning flanks 6 are provided, with which a bearing spot 10 can have reproducibly positioned upon it a carrier 11, which has a plurality of storage chambers 13, or a carrier 12 that carries a liquid or treatment means. The carrier 11 preferably has the layout of a microplate.

The bearing spot 10 defines a bearing region that corresponds to the area of a carrier 11, 12. The bearing region has an edge. A plurality of nozzles 4 extends outside of the edge, and can generate a gas flow that flows transverse to the aforementioned horizontal gas flow. The nozzles 4 thus generate a vertical gas flow. According to the invention, the nozzles are suction nozzles, but can also be blower nozzles. The nozzles 5 are connected with gas lines 9, which extend inside of the work deck 3 or below the work deck 3. The gas lines 9 connect the nozzles 5 with a pump 22, which generates a negative pressure, so that the nozzles 4 can be used to siphon gas out of the horizontal gas flow.

The nozzles 4 are designed as longitudinal slit nozzles, and have a uniform distance to the edge of the bearing spot 10. They are arranged so closely adjacent to each other as to generate an essentially closed gas curtain around the bearing spot 10, which extends along the edge of the bearing spot 10.

In the exemplary embodiment shown on FIG. 4, the bearing spot 10 is formed by a pocket, wherein the side walls of the pocket comprise the positioning flanks 6 against which an edge surface of the carrier 11, 12 can abut. The nozzles 4 can directly adjoin the side wall of the carrier 11, 12.

In the exemplary embodiment shown on FIG. 5, the positioning flanks 6 are formed by bars 7. These can involve angle bars 7, which can surround corner regions of the carrier 11. Sections of the side walls of the carrier 11 can abut against the interior sides of the bars 7. The nozzles 4 can directly adjoin the outer walls of the bars 7.

FIGS. 4 and 5 show not only nozzles 4 arranged outside of the bearing region of the bearing spots 10, but also nozzles 5 arranged inside of the bearing regions. The nozzles 5 are likewise connected with the gas line 9, so that they can be used as blow nozzles or suction nozzles, wherein they are preferably used as suction nozzles.

FIGS. 6 to 9 show carriers that are shaped like a plate, and in particular shaped like a microplate, wherein the microplate has the aforementioned layout dimensions. The carrier 11 has a lower side 16 that rests on the bearing region 10. The carrier 11 has an upper side 18 that faces away from the lower side 16, and into which openings of troughlike storage chambers 13 extend. The storage chambers 13 can be open. However, then can also be closeable with closures or covers. Gas passage openings 15 are arranged along an edge of an opening of the storage chamber 13. The gas passage openings 15 form a flow channel between the upper side 18 and the lower side 16.

Nozzles 5 are arranged inside of the bearing region of the bearing spot 10 in such a way as to align with the gas passage openings. A negative pressure generated with the nozzles thus generates a gas flow from the treatment space 2 into the gas passage opening 15, and hence a gas curtain around a storage chamber 13. The nozzles 5 are so closely adjacent as to form an uninterrupted gas curtain around the storage chamber 13.

Figure 9:
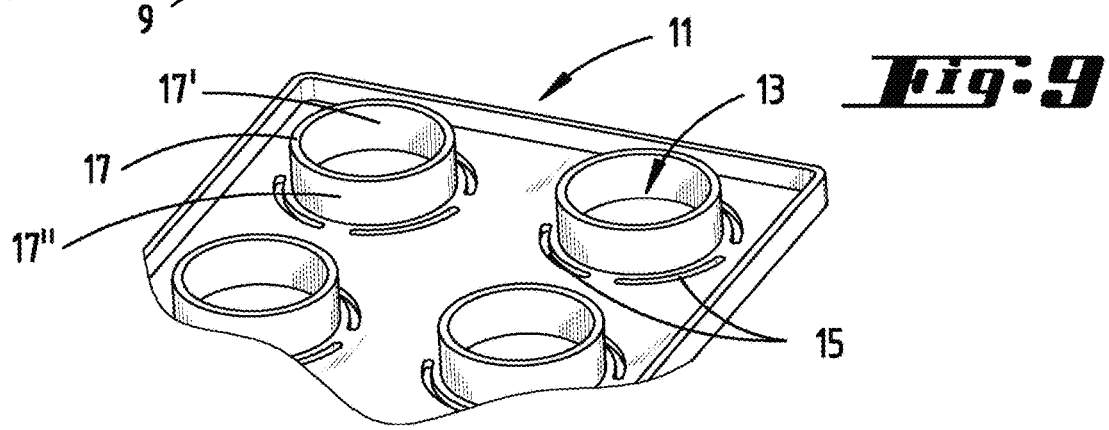
FIG. 9 is a perspective view of another exemplary embodiment of a carrier 11.

In the exemplary embodiment shown on FIG. 9, the boundary walls of the storage chambers 13 are comprised of tubular structures. These form a wall 17 with an interior side 17' and an exterior side 17". The gas passage openings 15 are arranged in an area so as to directly adjoin the external region 17". A gas curtain forms, which brushes along the exterior region 17".

The horizontally flowing gas flow is used to generate a gas curtain, which protects the upwardly open storage chambers 13 during treatment, for example with a pipette of a pipetting arrangement 8. The gas flows generated by the nozzles 4, 5 flow perpendicular thereto, and generate a vertical gas curtain, which can be used to prevent aerosol that arises during treatment, for example in the pipetting process, from being transported away from the horizontal gas flow, for example into other storage chambers. This prevents a cross contamination of various cell cultures located in various storage chambers 13. The arrangement of nozzles 4, 5 or gas passage openings 15 is selected in such a way as to produce an opening image that reveals openings arranged close together on a line. A continuous gas flow passes through the openings.

Additional apparatuses for treating the cell cultures can be provided in the treatment space 2, for example an apparatus for opening bottles or a microscope.

The above statements serve to explain the inventions covered by the application as a whole, which each also independently advance the prior art at least by the following feature combinations, wherein two, several or all of these feature combinations can also be combined, specifically:

A treatment apparatus, characterized in that the nozzles 4, 5 are arranged outside of and along an edge of the bearing region 10 or inside of the bearing region 10.

A treatment apparatus, characterized in that the bearing region 10 is a rectangular region, and the nozzles 4, 5 lie on lines extending parallel to the edges of the rectangular region and/or that the work deck 3 has a circular shape and several bearing regions 10 are arranged around a center Z of the work deck 3 and/or that the work deck 3 can be rotated around the center Z and/or that the work deck 3 is arranged in a housing 1 that is gastight to the outside, through which a gas flow 1 can be passed, and/or that means 20, 21 are provided to generate a filtered first gas flow inside of the housing that flows parallel to the work deck 3, wherein second gas flows generated by the nozzles 4, 5 run perpendicular to the first gas flow.

A treatment apparatus, characterized by one or several carriers 11 with one or several storage chambers 13 for accommodating biological cell cultures, wherein the carrier 11 has gas passage openings 15 that are arranged outside of and along an edge of a layout of the storage chamber 13, and align with the nozzles 5 with the carrier 11 placed on a bearing spot 10.

A carrier, characterized in that gas passage openings 15 are arranged outside of and along an edge of the layout of the storage chamber 13.

A treatment apparatus or a carrier, characterized in that the carrier 11, 12 has a rectangular layout with a lower side 16 that extends in one plane and with an upper side 18 that extends in a plane parallel thereto, with the opening regions of the storage chambers 13 lying in said upper side 18, wherein the gas passage openings 15 form connecting channels between the lower side 16 and the upper side 18 and/or that a pump 22 is provided to generate a negative pressure in nozzles 4, 5 or gas lines 9 that connect several nozzles 4, 5 with each other.

A treatment apparatus or a carrier, characterized in that the bearing spot has first positioning flanks 6 for securing second positioning flanks 14 of the carrier 11 and/or that the bearing spot 10 forms a frame for adjusting the position of the carrier 11, 12 on the work deck 3, wherein the nozzles 4 directly adjoin the frame or sections of the frame.

A treatment apparatus or a carrier, characterized in that gas lines 9 are arranged below an upper side of the work deck 3 that forms the bearing spots 10, and connected with the nozzles 4, 5 in terms of flow, wherein the nozzles 4, 5 are either gas outlet nozzles for generating a gas flow that exits the work deck 3 or suction nozzles for generating a gas flow that enters into the work deck 3, and/or that the gas flows generated by the nozzles 4, 5 form a barrier in the form of a gas curtain between adjacent carriers 11, 12 and/or adjacent storage chambers 13, which prevents a liquid or cells from passing from one storage chamber 13 into another storage chamber 13 while treating the biological cells, and/or that the nozzles 4, 5 generate a gas curtain that completely surrounds the carrier 11, 12 or storage chamber and is uniform.

A treatment apparatus or a carrier, characterized in that the layout of the storage chamber 13 is circular, and the gas passage openings 15 are arranged on a circular arc line around the layout, wherein the bearing region 10 has nozzles 5 arranged on a circular arc line, and/or that the storage chamber 13 has a wall 17 with an interior side 17' pointing into the storage chamber and an exterior side 17" pointing away from it, wherein the gas passage openings 15 directly adjoin the exterior side 17".

A treatment apparatus or a carrier, characterized in that the first carriers 11 are carrier plates and/or that the first carriers 11 are microplates with a layout of 127.76 mm×85.48 mm, and/or that the storage chambers 13 are troughs and/or that the storage chambers 13 are open or closed toward the top and/or that the first carrier 11 has several storage chambers 13, which each are surrounded by an arrangement of several gas passage openings 15, and/or that second carriers 12 are provided, whose layout is identical to the layout of the first carrier 11, and which store treatment liquids or treatment means, and/or that the nozzles 4, 5 or the gas passage openings 15 have an oblong layout.

A method, characterized in that the nozzles 4, 5 are used to generate a gas curtain that surrounds the carrier 11 and/or at least one of the storage chambers 13.

A method, characterized by a first gas flow that flows parallel to the work deck 3, and runs perpendicular to the second gas flow generated by the nozzles 4, 5.

All disclosed features (whether taken separately or in combination with each other) are essential to the invention. The disclosure of the application hereby also incorporates the disclosure content of the accompanying/attached priority documents (copy of the prior application) in its entirety, also for the purpose of including features of these documents in claims of the present application. Even without the features of a referenced claim, the subclaims characterize standalone inventive further developments of prior art with their features, in particular so as to submit partial applications based upon these claims. The invention indicated in each claim can additionally have one or several of the features indicated in the above description, in particular those provided with reference numbers and/or indicated on the reference list. The invention also relates to design forms in which individual features specified in the above description are not realized, in particular if they are recognizably superfluous with regard to the respective intended use, or can be replaced by other technically equivalent means.

REFERENCE LIST

1 Housing
2 Space
3 Work deck
4 Nozzle
5 Nozzle
6 First positioning flank
7 Bar
8 Pipette arrangement
9 Gas line
10 Bearing spot/bearing region
11 Carrier
12 Carrier
13 Storage chamber
14 Second positioning flank
15 Gas passage opening
16 Lower side
17 Wall
17' Interior side
17" Exterior side
18 Upper side
19 Inlet opening
20 Means, filter
21 Means, fan
22 Pump
23 Outlet opening
24 Bottle
Z Center

What is claimed is:

1. A treatment apparatus for treating biological cell cultures, the treatment apparatus comprising:
   a work deck (3) with one or more bearing spots (10) for bearing one or more respective carriers (11), wherein each of the one or more bearing spots (10) comprises a bearing region that corresponds to an area of a corresponding one of the one or more carriers (11);
   openings (4, 5) of the work deck (3) arranged outside or inside of the respective one or more bearing regions (10); and
   gas lines (9) that are fluidly connected to the openings (4, 5),
   wherein the openings (4) are configured to direct a first gas flow to flow transverse to an extent of the one or more bearing regions.

2. The treatment apparatus of claim 1, further comprising a pump (22) for generating a negative pressure, wherein the gas lines (9) of the suction nozzles (4, 5) are fluidly connected with the pump (22).

3. The treatment apparatus of claim 1,
   wherein the openings (4) comprise longitudinal slotted nozzles,
   wherein the openings (4) are located at a constant distance from respective edges of the one or more bearing spots (10), and
   wherein the openings (4) and the gas lines (9) are configured to form a gas curtain that surrounds each of the one or more bearing spots (10).

4. The treatment apparatus of claim 1, further comprising the one or more carriers (11) with one or more storage chambers (13) for accommodating the biological cell cultures,
   wherein the one or more carriers (11) are each supported by a corresponding one of the one or more bearing spots (10), and
   wherein each of the one or more carriers (11) has gas passage openings (15) that are aligned with respective openings (5) of the work deck (3).

5. The treatment apparatus of claim 1, further comprising:
   a housing (1); and
   means (20, 21) for generating a second gas flow inside of the housing (1) that flows parallel to an extent of the work deck (3),
   wherein the first gas flow flows perpendicular to the second gas flow.

6. The treatment apparatus of claim 1, wherein each of the one or more bearing spots (10) has positioning flanks (6) for securing respective sides (14) of the one or more carriers (11).

7. The treatment apparatus of claim 6,
   wherein the positioning flanks (6) are formed by a frame, and
   wherein the openings (4) of the work deck (3) directly adjoin the frame, or the frame has sections spaced apart from each other that are adjoined by the openings (4) of the work deck (3).

8. The treatment apparatus of claim 1,
   wherein the gas lines (9) are arranged below an upper side of the work deck (3) that forms the one or more bearing spots (10), and
   wherein the openings (4, 5) of the work deck (3) are either gas outlet nozzles for flowing the first gas flow from the work deck (3) or suction nozzles for flowing the first gas flow into the work deck (3).

9. The treatment apparatus of claim 1, further comprising a housing (1),
   wherein the work deck (3) has a circular shape,
   wherein the one or more bearing spots (10) are arranged around a center (Z) of the work deck (3),
   wherein the work deck (3) is rotatable around the center (Z), and wherein the work deck (3) is arranged within the housing (1).

10. A carrier, comprising:
one or more storage chambers (13) for accommodating biological cell cultures;
an upper side (18) that extends in a plane, wherein opening regions of the one or more storage chambers (13) are disposed in the upper side (18);
a lower side (16); and
one or more gas passage openings (15) arranged outside of the opening regions,
wherein the one or more gas passage openings (15) extend along respective edges of the one or more storage chambers (13), and
wherein the one or more gas passage openings (15) form channels that fluidly connect the lower side (16) and the upper side (18).

11. The carrier of claim 10, wherein each of the one or more storage chambers (13) has a circular outline, and the one or more gas passage openings (15) are arranged on a circular arc line around each of the one or more storage chambers (13).

12. The carrier of claim 10,
wherein each of the one or more storage chambers (13) has a wall (17) with an interior side (17') facing into the storage chamber (13) and an exterior side (17") facing away from interior side (17'), and
wherein the one or more gas passage openings (15) directly adjoin the exterior side (17").

13. A method for treating biological cells that are located in respective one or more storage chambers (13) of the carrier (11) according to claim 10, the method comprising:
placing the carrier (11) on a bearing spot (10) of a work deck (3); and
flowing a first gas flow via openings (4, 5) of the work deck (3) so as to generate a gas curtain that surrounds one or more of the carrier (11) or the one or more storage chambers (13), and that is directed transverse to an extent of a bearing region of the bearing spot (10).

14. The method of claim 13,
wherein the one or more storage chambers (13) comprise a plurality of storage chambers (13), and
wherein the gas curtain prevents cross contamination between the storage chambers (13) while the biological cells are being treated.

15. The method of claim 13, further comprising flowing a second gas flow parallel to an extent of the work deck (3), wherein the first gas flow flows perpendicular to the second gas flow.

16. The method of claim 13, wherein flowing the first gas flow comprises flowing the first gas flow into or out of the openings (4, 5) of the work deck (3).

* * * * *